(12) United States Patent
Fujita et al.

(10) Patent No.: US 11,189,846 B2
(45) Date of Patent: Nov. 30, 2021

(54) ELECTRICALLY-CONDUCTIVE MEMBER AND METHOD OF MANUFACTURING THE SAME

(71) Applicants: FLOSFIA INC., Kyoto (JP); EYETEC CO., LTD., Fukui (JP); KYOTO UNIVERSITY, Kyoto (JP)

(72) Inventors: Shizuo Fujita, Kyoto (JP); Masafumi Ono, Kyoto (JP); Takayuki Uchida, Kyoto (JP); Kentaro Kaneko, Kyoto (JP); Takashi Tanaka, Fukui (JP); Toshimi Hitora, Kyoto (JP); Shingo Yagyu, Kyoto (JP)

(73) Assignees: FLOSFIA INC., Kyoto (JP); EYETEC CO., LTD., Fukui (JP); KYOTO UNIVERSITY, Kyoto (JP)

( * ) Notice: Subject to any disclaimer, the term of this patent is extended or adjusted under 35 U.S.C. 154(b) by 293 days.

(21) Appl. No.: 16/608,283

(22) PCT Filed: Apr. 27, 2018

(86) PCT No.: PCT/JP2018/017306
§ 371 (c)(1),
(2) Date: Oct. 25, 2019

(87) PCT Pub. No.: WO2018/199327
PCT Pub. Date: Nov. 1, 2018

(65) Prior Publication Data
US 2020/0127302 A1 Apr. 23, 2020

(30) Foreign Application Priority Data
Apr. 28, 2017 (JP) .............................. JP2017-089170
Apr. 28, 2017 (JP) .............................. JP2017-089171

(51) Int. Cl.
*H01M 8/021* (2016.01)
*C22C 38/04* (2006.01)
(Continued)

(52) U.S. Cl.
CPC ............. *H01M 8/021* (2013.01); *C22C 38/04* (2013.01); *C22C 38/44* (2013.01);
(Continued)

(58) Field of Classification Search
CPC .. H01M 8/021; H01M 8/0228; H01M 8/0254; H01M 2008/1095; C22C 38/04; C22C 38/44
See application file for complete search history.

(56) References Cited

U.S. PATENT DOCUMENTS

2006/0105218 A1 5/2006 Ishikawa et al.
2006/0134501 A1 6/2006 Lee et al.
2008/0233456 A1 9/2008 Ishikawa et al.

FOREIGN PATENT DOCUMENTS

JP 2006-156386 6/2006
JP 2009224151 * 10/2009
JP 2014-67491 4/2014

OTHER PUBLICATIONS

English translation of JP 2009-224151 obtained via Google Patents Oct. 6, 2021 (Year: 2009).*
(Continued)

*Primary Examiner* — Sarah A. Slifka
(74) *Attorney, Agent, or Firm* — Wenderoth, Lind & Ponack, L.L.P.

(57) ABSTRACT

An electrically-conductive member having sufficient corrosion resistivity even when the electrically-conductive member is exposed to high potential environment and a method of manufacturing the electrically-conductive member are offered. An electrically-conductive member is obtained by a
(Continued)

mist CVD method, by forming a metal oxide film on a base member of a separator, and the electrically-conductive member has an active potential range and a passive potential range in an anode polarization curve that is measured in a sulfuric acid aqueous solution having a sulfuric acid concentration that is $5.0 \times 10^{-4}$ mol/dm$^3$ at pH3 and having a temperature of 25° C., an anode current density that is $1 \times 10^{-7}$ A/cm$^2$ or less in the passive potential range, and the passive potential range reaching to an electric potential that is 1V.

27 Claims, 4 Drawing Sheets

(51) Int. Cl.
*C22C 38/44* (2006.01)
*H01M 8/0228* (2016.01)
*H01M 8/0254* (2016.01)
*H01M 8/1018* (2016.01)

(52) U.S. Cl.
CPC ....... *H01M 8/0228* (2013.01); *H01M 8/0254* (2013.01); *H01M 2008/1095* (2013.01)

(56) References Cited

OTHER PUBLICATIONS

International Search Report dated Aug. 7, 2018 in International (PCT) Application No. PCT/JP2018/017306.

* cited by examiner

ELECTRICALLY-CONDUCTIVE MEMBER AND METHOD OF MANUFACTURING THE SAME

TECHNICAL FIELD

The present disclosure relates to an electrically-conductive member that requires corrosion resistance and electrical conductivity, for example, used as a separator of a fuel cell and for other various applications, and also relates to a method of manufacturing an electrically-conductive member.

BACKGROUND ART

A separator of a polymer electrolyte fuel cell having electrical conductivity is configured to electrically connect each unit cell of a fuel cell to collect energy (electricity) generated in each unit cell, to form a flow path for liquid and/or gas, and to supply a fuel gas and/or an oxidizing gas to the fuel cell surface, and discharge water generated on the cathode side from the fuel cell together with air and the like after reaction. Also, separators are required to have characteristics such as airtightness to prevent mixing the fuel gas and air, and corrosion resistance in power generation environment.

Materials used for separators include mainly carbonaceous materials and metallic materials. Separators using carbon-based materials are excellent in terms of corrosion resistance, however, tend to have a problem in electrical conductivity, and the separators require a certain thickness in order to obtain sufficient strength and airtightness, and that is a factor to prevent miniaturization and thinning. In addition, the carbon-based material has a problem in that the material cost and the processing cost tend to be high. On the other hand, the separator of a metallic material can be formed to be thin because the separator of the metallic material tends to have sufficient strength and airtightness, however, the separator of the metallic material tends to be corrosive and has a problem in corrosion resistance. Separator using stainless steel has been investigated as a metallic separator that is relatively excellent in corrosion resistance. A separator of stainless steel usually has a passive film that is naturally formed on a surface of a stainless-steel member, and this passive film tends to cause increase of contact resistance. In addition, even stainless steel has a disadvantage, in that metals tend to be influenced by corrosive substances (such as strong acids) generated in operating environment of fuel cells and are ionized and eluted. Therefore, a separator made of stainless steel is required to add corrosion resistance and electrical conductivity by, for example, conducting a surface treatment of the passive film that is naturally formed.

As a surface treatment method for a separator including a base member of stainless-steel, PL1 describes methods of forming a metal oxide film as an electrically-conductive corrosion-preventing coating film by using a deposition method such as sputtering or a wet coating method such as spraying. Also, PL2 describes that a protective film is formed by applying a raw material solution containing metal oxide fine particles to a Cr-containing stainless-steel base member by an anion electrodeposition coating method, and firing the applied raw material solution in order to suppress degradation of the stainless-steel base member.

However, when the metal oxide film is formed on the base member of the stainless-steel as it is by using the method described in PL1, the adhesiveness between the metal oxide film and the base member has been insufficient. In addition, even when one or more metal layers are further provided to enhance adhesion between the metal oxide film and the base member, it was still difficult to obtain sufficient adhesion and corrosion resistance, and thus, insufficient for a practical use as a separator of a fuel-cell. Also, in the method described in PL2, a water washing step for reducing a residual of pinholes and bubbles in a protective film is indispensable, and the steps, further requiring steps of firing the resin component in the coating film and sintering to finally form the protective film, became complicated. Furthermore, even when a protective film was formed by the method described in PL 2, the uniform and sufficient strength and corrosion resistance over the entire surface of the base member were not obtained due to the effect of pores remaining in the protective film or the like, and thus, this method was not satisfactory enough.

Furthermore, LED lighting having a design life of several times longer than that of incandescent bulbs or fluorescent lamps has been investigated to extend the life of lighting, and also there is such a demand for extension of the design life in the field of fuel cells. However, when a separator is exposed to high potential environment for long hours, corrosion resistance becomes difficult to be maintained even if the separator is coated with a metal oxide film, and that is an obstacle to extend the design life of the fuel cell. Accordingly, a separator having sufficient corrosion resistance even after exposed to high potential environment for long hours has been demanded to realize the extension of design life of the fuel cell.

PATENT LITERATURE

PL1: JP2006-156386
PL2: JP2014-067491A

SUMMARY OF INVENTION

Technical Problem

The present inventive subject matter has an object to provide an electrically-conductive member having sufficient corrosion resistance even in high potential environment. The present inventive subject matter has another object to provide a manufacturing method capable of manufacturing an electrically-conductive member having sufficient corrosion resistance even in high potential environment industrially advantageously.

Solution to Problem

The present inventors made careful investigations to achieve the object above, and as a result of the investigations, the inventors surprisingly created an electrically-conductive member in that an active electric potential area and a passive electric potential area were formed in an anode polarization curve that is measured in a sulfuric acid aqueous solution having a sulfuric acid concentration that is $5.0 \times 10^{-4}$ mol/dm$^3$ at pH3 and having a temperature of 25° C., an anode current density is $1 \times 10^{-7}$ A/cm$^2$ or less in the passive potential range, and the passive potential range reaches to an electric potential that is 1V, after a metal oxide film is formed on the electrically-conductive member that is a separator base member by a mist CVD method using a raw material solution containing a tetravalent metal instead of using a raw material solution containing a divalent metal. Accordingly, the electrically-conductive member has corrosion resistance in a targeted range of almost whole potential range for use, and that enables to extend the lifetime of a fuel cell. The inventors found that the electrically-conductive member and the method of manufacturing the electrically-conductive member can solve a conventional problem, and conducted further investigations to complete the present inventive subject matter.

[1] An electrically-conductive member includes an active potential range and a passive potential range in an anode polarization curve that is measured in a sulfuric acid aqueous solution having a sulfuric acid concentration that is $5.0\times10^{-4}$ mol/dm$^3$ at pH3 and having a temperature of 25° C.; and an anode current density that is $1\times10^{-7}$ A/cm$^2$ or less in the passive potential range, the passive potential range reaching to an electric potential that is 1V.

[2] The electrically-conductive member of [1] further includes a metal oxide film that contains a metal oxide as a major component, the metal oxide film arranged on at least a part of a surface or a whole surface on the electrically-conductive member.

[3] The electrically-conductive member of [2], wherein the metal oxide contains tin.

[4] The electrically-conductive member of [2] or [3], wherein the metal oxide film is doped with a dopant.

[5] The electrically-conductive member of any of [2] to [4], wherein the metal oxide film has a contact resistance that is 500 mΩ·cm$^2$ or less with a contact area 1 cm$^2$ and weight 400_N after the electrically-conductive member being soaked for 550 hours in sulfuric acid at pH2 having a temperature of 60° C.

[6] The electrically-conductive member of any of [1] to [5], wherein the electrically-conductive member includes a base member that includes as a major component stainless steel, carbon steel, nickel steel, iron, chrome, nickel, cobalt, niobium, tungsten, molybdenum, manganese, aluminum, copper, magnesium or an alloy combining two or more thereof.

[7] The electrically-conductive member of any of claims 1 to 5, wherein the electrically-conductive member includes a base member that includes stainless steel as a major component.

[8] The electrically-conductive member of [6] or [7], wherein the base member includes an uneven shape including a projected portion and a recessed portion on at least a part of a surface or a whole surface of the base member.

[9] The electrically-conductive member of [8], wherein the uneven shape of the projected portion and the recessed portion includes a flow channel pattern.

[10] The electrically-conductive member of any of [1] to [9], wherein the electrically-conductive member is a separator.

[11] An electronic device includes the electrically-conductive member of any of [1] to [10].

[12] The electronic device of [11], wherein the electronic device is a fuel cell.

[13] A product includes the electronic device of [11] or [12].

[14] The product of [13] further includes a drive device.

[15] A system includes the product of [13] or [14]; and a CPU.

[16] A use of a product includes an electronic device or a drive device, including the electrically-conductive member of any of [1] to [10] or a drive device of the electronic device.

[17] A method of manufacturing an electrically-conductive member includes obtaining atomized droplets by atomizing a raw material solution containing a metal; supplying a carrier gas to the atomized droplets to carry the atomized droplets onto a base member; and heating the atomized droplets adjacent to the base member to cause thermal reaction of the atomized droplets to form a passive film on at least a part of a surface or a whole surface of the base member.

[18] The method of claim [17], wherein the passive film includes a passive potential range in an anode polarization curve measured in a sulfuric acid aqueous solution at pH3 having a temperature of 60° C.

[19] A method of manufacturing an electrically-conductive member includes: atomizing a raw material solution containing a tetravalent metal to generate atomized droplets; supplying a carrier gas to the atomized droplets to carry the atomized droplets onto a base member; and heating the atomized droplets adjacent to the base member to cause thermal reaction of the atomized droplets to form a metal oxide film on at least a part of a surface or a whole surface of the base member such that the electrically-conductive member comprising the base member and the metal oxide film formed on the at least the part of the surface or the whole surface of the base member comprises a passive potential range in an anode polarization curve that is measured in a sulfuric acid aqueous solution at pH3 and having a temperature of 60° C.

[20] The method of any of [17] to [19], wherein the metal is tin.

[21] The method of any of [17] to [20], wherein the raw material solution contains a dopant.

[22] The method of [21], wherein the dopant contains antimony or fluorine.

[23] The method of any of [17] to [22], wherein the raw material solution includes a solvent that contains water.

[24] The method of any of [17] to [23], wherein the base member contains as a major component stainless steel, carbon steel, nickel steel, iron, chrome, nickel, cobalt, niobium, tungsten, molybdenum, manganese, aluminum, copper, magnesium or an alloy combining two or more thereof.

[25] The method of any of [17] to [24], wherein the base member contains stainless steel as a major component.

[26] The method of any of claims [17] to [25], wherein the base member includes an uneven shape of a projected portion and a recessed portion on at least a part of a surface or a whole surface of the base member.

[27] The method of [26], wherein the uneven shape of the projected portion and the recessed portion includes a flow channel pattern.

[28] The method of any of [17] to [27], wherein the base member includes a member of a separator.

[29] The method of any of [17] to [28], wherein the heating is conducted at a temperature that is 500° C. or less.

[30] The method of any of [17] to [29], wherein the thermal reaction is conducted in a non-vacuum environment.

Advantageous Effect of the Invention

An electrically-conductive member according to a present inventive subject matter has sufficient corrosion resistivity even when the electrically-conductive member is exposed to high potential environment, and thus, if the electrically-conductive member is arranged in a fuel cell, the electrically-conductive member is able to serve to extend the life of a fuel cell. Also, according to a method of a present inventive subject matter, it is possible to provide a manufacturing method capable of manufacturing industrially advantageously an electrically-conductive member having sufficient corrosion resistance even in high potential environment, and if the electrically-conductive member is arranged in a fuel cell, the electrically-conductive member is able to serve to extend the life of a fuel cell.

DESCRIPTION OF EMBODIMENTS

Figure 1:
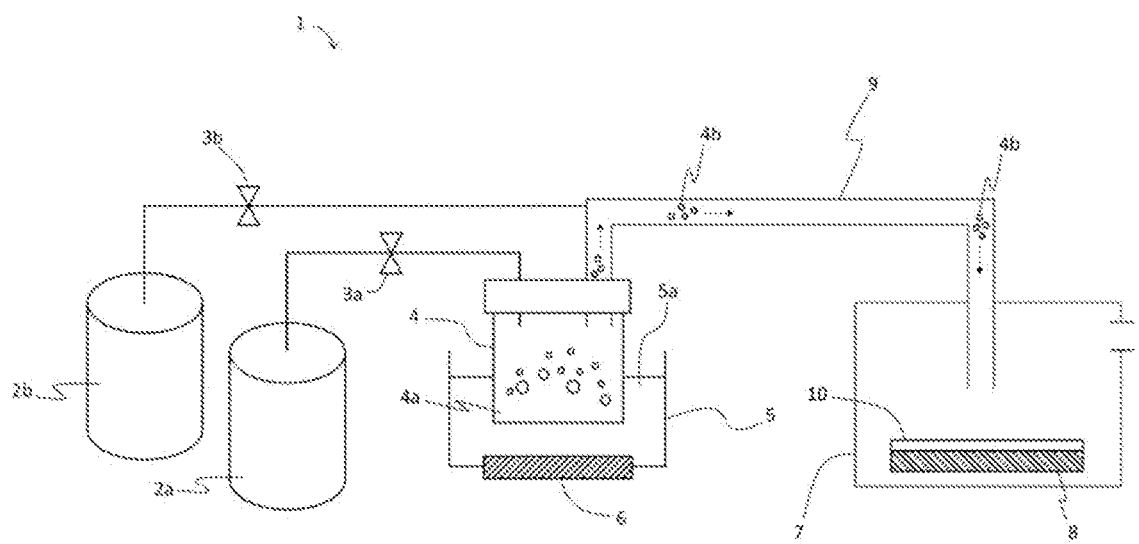
FIG. 1 shows a schematic diagram of a mist CVD apparatus as a film (layer)-formation apparatus used according to an embodiment of a method.

An electrically-conductive member according to an aspect of a present inventive subject matter, it is characterized that the electrically-conductive member has an active potential range and a passive potential range in an anode polarization curve measured in a sulfuric acid aqueous solution having a sulfuric acid concentration that is $5.0 \times 10^{-4}$ mol/dm$^3$ at pH3 and having a temperature of 25° C., an anode current density that is $1 \times 10^{-7}$ A/cm$^2$ or less in the passive potential range, and the passive potential range reaching to an electric potential that is 1V.

The electrically-conductive member has an electrical conductivity, and is not particularly limited as long as the electrically-conductive member has an active potential range and a passive potential range in an anode polarization curve measured in a sulfuric acid aqueous solution having a sulfuric acid concentration of $5.0 \times 10^{-4}$ mol/dm$^3$ at pH3 and having a temperature of 25° C., an anode current density that is $1 \times 10^{-7}$ A/cm$^2$ or less in the passive potential range, and the passive potential range reaching to an electric potential that is 1V. In a present inventive subject matter, the passive potential range preferably reaches to an electric potential that is 1.7 V. The electrically-conductive member may be made of a base member, and also the electrically-conductive member may include a base member and a film of metal or a film of metal oxide arranged on a surface of the base member. According to a present inventive subject matter, an electrically-conductive member including a base member and a metal oxide film containing a metal oxide as a major component and arranged on at least a surface of the base member or formed on a whole surface of the base member is preferable to have higher corrosion resistance.

Examples of a metal contained in the metal oxide are not particularly limited, and may include metals in the d-block of the periodic table and silicon (Si), however, according to a present inventive subject matter, the metal contained in the metal oxide preferably contains a tetravalent metal. Examples of the tetravalent metal include titanium (Ti), zirconium (Zr), hafnium (Hf), silicon (Si), germanium (Ge), and tin (Sn). According to a present inventive subject matter, the metal contained in the metal oxide preferably contains tin (Sn).

The metal oxide film is not particularly limited as long as the metal oxide film contains a metal oxide as a major component. The term "major component" herein means that the metal oxide as the major component contained in the metal oxide film accounts for 50% or more by composition ratio in the metal oxide film, preferably accounts for 70% or more, further preferably accounts for 90% or more, and may be 100%. Also, according to a present inventive subject matter, a metal oxide film doped with a dopant is also preferable. The dopant is not particularly limited as long as an object of the present inventive subject matter is not interfered with. Examples of the dopant include tin (Sn), germanium (Ge), silicon (Sn), titanium (Ti), zirconium (Zr), vanadium (V), niobium (Nb), antimony (Sb), tantalum (Ta), fluorine (F), chlorine (Cl), and cerium (Ce). According to a present inventive subject matter, the dopant is preferably antimony (Sb) or fluorine (F), and the metal oxide film is preferably an antimony-doped tin oxide (ATO) film or a fluorine-doped tin oxide (FTO) film to obtain corrosion resistivity in high potential environment. The contained amount of the dopant in the metal oxide film is not particularly limited, however, the contained amount of the dopant in the metal oxide film is preferably 0.00001 atomic percent (at. %) or more in composition of the metal oxide film, further preferably in a range of 0.00001 at. % to 20 at. %, and most preferably in a rage of 0.00001 at. % to 10 at. %.

(Base Member)

The base member is not particularly limited as long as an object of the present inventive subject matter is not interfered with, and usually a base member having an electrical conductivity is used. Constituent material(s) of the base member are not particularly limited, however, according to a present inventive subject matter, the base member preferably contains as a major component stainless steel, carbon steel, nickel steel, iron, chrome, nickel, cobalt, niobium, tungsten, molybdenum, manganese, aluminum, copper, magnesium or an alloy combining two or more thereof, and the base member further preferably contains stainless steel as a major component. The term "major component" herein means that, if the base member contains as a major component stainless steel, the stainless steel as the major component is contained in the base member such that the stainless steel accounts for 50% or more of composition materials by atomic ratio in the base member, preferably accounts for 70% or more, and further preferably accounts for 90% or more, and the stainless steel as a major component may be 100%. The stainless steel is not particularly limited as long as an object of a present inventive subject matter is not interfered with, and a known stainless steel may be used. Examples of the stainless steel include ferritic stainless steel, martensitic stainless steel, and austenitic stainless steel. Examples of the ferritic stainless steel include SUS430, SUS434, and SUS405. Examples of the martensitic stainless steel include SUS403, SUS410, and SUS431. Examples of the austenitic stainless steel include SUS201, SUS304, SUS304L, SUS304LN, SUS310S, SUS316, SUS316L, SUS317J1, SUS317J2, SUS321, SUS329J1, SUS836, and SUSXM7. According to a present inventive subject matter, the base member of stainless steel is preferably selected from among examples of the austenitic stainless steel. Also, the carbon steel is not particularly limited as long as an object of the present inventive subject matter is not interfered with, and a known carbon steel may be used. Examples of the carbon steel include low-carbon steel, medium-carbon steel, and high-carbon steel. Examples of the low-carbon steel include SS400, SM400, and SM490. Examples of the medium-carbon steel include S35C, S45C, and S53C. Examples of the high-carbon steel include S55C. Furthermore, if the base member is made of nickel steel, a known nickel steel may be used as long an object of the present inventive subject matter is not interfered with. Examples of the nickel steel include SL2N255, SL3N255, SL3N275, SL3N440, SL5N590, SL7N590, SL9N520, and SL9N590.

The base member may have various shapes, and according to a present inventive subject matter, it is effective for various shapes of the base member. Examples of the shape of the base member include a plate shape including a flat plate shape, a disk shape or the like, a fibrous shape, a rod shape, a cylindrical shape, a prismatic shape, a tubular shape, a spiral shape, a spherical shape, and a ring shape. According to a present inventive subject matter, the base member preferably has a plate shape. Also, according to a present inventive subject matter, at least a part of a surface of the base or a whole surface of the base member preferably include an uneven shape of a recessed portion and/or a projected portion. Furthermore, according to a preferable aspect of a present inventive subject matter, the base member includes an uneven shape of a projected portion and/or a recessed portion on a whole surface of a first side of the base member. Furthermore, according to another aspect of a present inventive subject matter, the base member preferably includes an uneven shape of a projected portion and/or a recessed portion on a whole surface of the first surface of the base. Also, according to another aspect of a present inventive subject matter, the base member preferably includes a first surface, a second surface that is positioned at an opposite side of the first surface, the base member includes an uneven shape including a projected portion and/or a recessed portion arranged in parallel with a first direction in a plan view on the first surface, and the base member may include an uneven shape including a projected portion and/or a recessed portion arranged in parallel with a second direction that is perpendicular to the first direction in a plan view on the second surface. Also, according to a present inventive subject matter, the base member is able to be arranged as a separator member in a fuel cell, and the base member is preferably a separator member. In this case, the uneven shape of the projected portion and/or the recessed portion of the member as a separator is used as a flow path of fluid such as liquid and/or gas.

(Uneven Shape)

The uneven shape is not particularly limited as long as the uneven shape includes a projected portion and/or a recessed portion. The uneven shape may be configured by projected portions, and also, the uneven shape may be configured by recessed portions. Also, the uneven shape may be configured by projected portions and recessed portions. The uneven shape may be configured by regularly arranged projected portions or regularly arranged recessed portions, and also, the uneven shape may be configured by irregularly arranged projected portions or irregularly arranged recessed portions. According to a present inventive subject matter, the uneven shape of the projected portion and/or the recessed portion is preferably periodically arranged, and further preferably arranged in a periodic and regular pattern. Also, according to a present inventive subject matter, the uneven shape of the projected portions and/or the recessed portions is preferably used as flow path pattern of a separator arranged in a fuel cell. The periodic and regular pattern of the uneven portion including the projected portions and/or the recessed portions is not particularly limited, and examples of the periodic and regular pattern of the uneven portion include a stripe pattern, a dot pattern, a lattice-like pattern, and a mesh pattern. According to a present inventive subject matter, the periodic and regular pattern is preferably a stripe pattern, a dot pattern, or a lattice-like pattern.

The flow path pattern is not particularly limited as long as the flow path pattern functions as a flow path for fluid such as liquid and/or gas when the base member is applied as a separator to a fuel cell, and a known flow path pattern may be used. Examples of the flow path pattern may include a serpentine type flow path pattern, in which one or two or more flow paths are arranged to meander in a serpentine manner, parallel type flow path pattern, in which two or more linear paths are arranged in parallel or a combination of the serpentine type flow path pattern and the parallel type flow path pattern is arranged. According to a present inventive subject matter, the flow path pattern is preferably the parallel type flow path pattern.

A cross-sectional shape of the uneven shape of the projected portion or the recessed portion is not particularly limited, however, examples of the cross-sectional shape of the uneven shape may include a channel shape, a U-shape, a converted U-shape, corrugated shape, polygons including a triangle, a quadrangle (for example, a square, a rectangle or a trapezoid), and/or a polygon including a pentagon and a hexagon. Examples of a planar shape of the recessed portion and/or the projected portion may include a circle, an ellipse, a triangle, a quadrangle (for example, a square, a rectangle, or a trapezoid), and/or a polygon including a pentagon or a hexagon. According to a layered structure used for a separator of a fuel cell as an embodiment of the present inventive subject matter, the planar shape of the recessed portion preferably has a rectangular shape.

A material component of the projected portion is not particularly limited and may be a known material. The projected portion may be made of an electrically-insulating material, a semiconductor material, or the same material as the material of the base member. The material component of the projected portion may be amorphous, single crystal, or polycrystalline. Examples of the material component of the projected portion include carbon, diamond, a metal, an oxide, a nitride, and/or a carbide of at least one selected from among silicon (Si), germanium (Ge), titanium (Ti), zirconium (Zr), hafnium (Hf), tantalum (Ta), and tin (Sn), and/or a mixture of at least two of the mentioned examples. For more details, $SiO_2$, silicon-containing compound containing as a major component SiN or polycrystalline silicon, a metal that has a melting point that is higher than a temperature at that the film is grown are named. Examples of the metal include precious metals such as platinum, gold, silver, palladium, rhodium, iridium, and ruthenium. Also, the material component contained in the projected portion accounts for 50% or more of composition materials by composition ratio, preferably accounts for 70% or more, and most preferably accounts for 90% or more. According to an aspect of a present inventive subject matter, the projected portion may include a mask material that may be removable after film-formation. The way to remove the mask is not particularly limited, and a known method may be used, and the method may be dry etching or wet etching.

A method of forming the projected portion may be a known method. Examples of the method of forming the projected portion include a photolithography, electron beam lithography, laser patterning, screen printing, etching (for example, dry etching or wet etching) and other known patterning methods. According to a present inventive subject matter, the projected portion preferably may have a stripe pattern, a mesh pattern or a lattice-like pattern, and further preferably a lattice-like pattern. The projected portion is also preferable to be a projected portion that is provided by processing the base. A method of processing the base is not particularly limited and a known processing method may be used. Examples of the method of processing the base include etching (for example, dry etching or wet etching), and press working.

The recessed portion is not particularly limited, however, the component material at the recessed portion may be the same component as the component material at the projected portion, and also, the recessed portion may be formed in and made of the base member. According to a present inventive subject matter, the recessed portion preferably has a stripe pattern, a mesh pattern or a lattice-like pattern. A procedure of forming the recessed portion may include a same procedure as that of forming the projected portion. The recessed portion may be a recessed portion that is provided by a mask material. It is also preferable that the recessed portion is a recessed portion that is provided by processing the base member, and a known processing procedure may be used. A method of processing the base member is not particularly limited as long as an object of the present inventive subject matter is not interfered with, and width, depth and terrace width of the recessed portion are not particularly limited and may be appropriately set.

As a preferable method of manufacturing an electrically-conductive member, the method may include forming a metal oxide film on at least a part of a surface or a whole surface of the base member, and producing the electrically-conductive member that includes a passive potential range in an anode polarization curve measured in a sulfuric acid aqueous solution at pH3 and a temperature of 60° C. A method of forming the metal oxide film includes obtaining atomized droplets by atomizing a raw material solution containing a tetravalent metal (generating atomized droplets); supplying a carrier gas to the atomized droplets to carry the atomized droplets onto a base member (carrying the atomized droplets); and heating the atomized droplets adjacent to the base member to cause thermal reaction (forming a film).

Also, the present inventive subject matter includes a method of manufacturing an electrically-conductive member by forming a passive film on at least a part of a surface or a whole surface on the electrically-conductive member, and the method includes atomizing a raw material solution containing a metal, supplying a carrier gas to the atomized droplets onto the base member, causing thermal reaction of the atomized droplets adjacent to the base member. According to a present inventive subject matter, a passive film in quality is able to be obtained, for example, by generating atomized droplets using ultrasonic vibration such that the atomized droplets with an initial velocity that is zero are generated, supplying carrier gas to carry the atomized droplets onto the base member, and causing a thermal reaction of the atomized droplets, while passive films in quality are difficult to be obtained by another method such as a spray method.

Also, the passive film is not particularly limited as long as a passive potential range is included, however, it is preferable that the passive potential range is able to be confirmed in an anode polarization curve measured in a sulfuric acid aqueous solution at pH3 and having a temperature of 60° C. (Raw-Material Solution)

The raw-material solution is not particularly limited as long as the raw-material solution contains a metal, and atomized droplets are able to be generated from the raw-material solution. The raw-material solution may contain an organic material and/or an inorganic material. The metal contained in the raw-material solution is not particularly limited as long as an object of the present inventive subject matter is not interfered with, and may be a metal simple substance and/or a metal compound. According to a present inventive subject matter, the metal preferably contains a tetravalent metal. Examples of the tetravalent metal include titanium (Ti), zirconium (Zr), hafnium (Hf), silicon (Si), germanium (Ge), and tin (Sn). In a present inventive subject matter, the metal preferably contains tin (Sn). The contained amount of the metal in the raw-material solution is not particularly limited, however, preferably in a range of 0.001 weight percent (wt. %) to 80 wt. %, and further preferably in a range of 0.01 wt. % to 80 wt. %.

According to a present inventive subject matter, a raw-material solution containing the metal in the form of a complex or salt dissolved or dispersed in an organic solvent or water is preferably used. Examples of the form of the complex include an acetylacetonate complex, a carbonyl complex, an amine complex, and a hydride complex. Also, examples of the form of the salt include organic metal salts (for example, metal acetate, metal oxalate, metal citrate, etc.), metal sulfide salts, metal nitrate salts, phosphorylated metal salts, metal halide salts (for example, metal chloride salts, metal bromide salts, metal iodide salts, etc.).

A solvent of the raw-material solution is not particularly limited and may be an inorganic solvent including water. Also, a solvent of the raw material solution may be an organic solvent including alcohol. Furthermore, a mixed solvent of water and alcohol may be used. According to a present inventive subject matter, a solvent of the raw material solution preferably contains water, and a mixed solvent of water and alcohol is further preferably used, and most preferably, a solvent of the raw material solution is water. Examples of water include pure water, ultrapure water, tap water, well water, mineral water, hot spring water, spring water, fresh water and ocean water. According to embodiments of a present inventive subject matter, ultrapure water is preferable as a solvent of a raw material solution.

Also, an additive that may be a hydrohalic acid and/or an oxidant, for example, may be added into the raw-material solution. Examples of the hydrohalic acid include a hydrobromic acid, a hydrochloric acid, and a hydriodic acid, and among the examples, a hydrobromic acid or a hydriodic acid is preferable. Examples of the oxidant include peroxides such as hydrogen peroxide ($H_2O_2$), sodium peroxide ($Na_2O_2$), barium peroxide ($BaO_2$), benzoyl peroxide ($(C_6H_5CO)_2O_2$, and organic peroxides such as hypochlorous acid (HClO), perchloric acid, nitric acid, ozone water, peracetic acid, and nitrobenzene.

A raw-material solution containing a dopant is also preferably used as the raw-material solution. The raw-material solution containing a dopant enables to control electrical conductivity of a film to be obtained even without applying ion-implantation to the film, and enables to give an electrical-conductivity to the base member. The dopant is not particularly limited as long as an object of a present inventive subject matter is not interfered with. Examples of the dopant include tin, germanium, silicon, titanium, zirconium, vanadium, niobium, antimony, tantalum, fluorine, chlorine, and cerium. According to an aspect of a present inventive subject matter, the dopant is preferably antimony or fluorine. The dopant concentration, in general, may be in a range of $1 \times 10^{16}/cm^3$ to $1 \times 10^{22}/cm^3$. Also, the dopant concentration may be at a lower concentration of, for example, approximately $1 \times 10^{17}/cm^3$ or less. Furthermore, according to an aspect of a present inventive subject matter, the dopant may be contained at a high concentration, that is $1 \times 10^{20}/cm^3$ or more, for example.

(Generating Atomized Droplets)

In generating atomized droplets, atomized droplets are generated from the raw material solution. A procedure of generating atomized droplets is not particularly limited as long as the raw material solution is able to be atomized, and a known procedure for atomization may be used, however, according to a present inventive subject matter, generating atomized droplets by using ultrasonic vibration is preferable. The atomized droplets floating in space and having the initial velocity that is zero are preferable, and for example, atomized droplets floating in space and carriable as gas are further preferable, without being blown like a spray. The size of droplets is not limited to a particular size, and may be a few mm, however, the size of atomized droplets is preferably 50 μm or less, and further preferably in a range of 1 to 10 μm.

(Carrying the Atomized Droplets)

In carrying the atomized droplets, carrier gas is supplied to the atomized droplets obtained at the generating atomized droplets, and the atomized droplets are carried by the carrier gas onto the base member. The carrier gas is not particularly limited as long as an object of the present inventive subject matter is not interfered with, preferable examples of the carrier gas include inert gas such as nitrogen and argon, oxygen-containing gas such as oxygen and ozone, and reducing gas such as hydrogen gas and forming gas. The type of carrier gas may be one or more, and a dilution gas at a reduced flow rate (e.g., 10-fold dilution gas) and the like may be further used as a second carrier gas. The carrier gas may be supplied from one location or two or more locations. While the flow rate of the carrier gas is not particularly limited, the flow rate of the carrier gas may be in a range of 0.01 to 20 L/min. According to an embodiment of a present inventive subject matter, the flow rate of the carrier gas may be preferably in a range of 1 to 10 L/min. When a dilution gas is used, the flow rate of the dilution gas is preferably in a range of 0.001 to 10 L/min, and the flow rate of the dilution gas is further preferably in a range of 0.1 to 5 L/min.

(Forming a Film)

In forming a film, the atomized droplets are thermally reacted (thermal reaction) to form a metal oxide film on the base member, which is placed in the film (layer)-formation chamber. Herein, the "thermal reaction" is sufficient as long as the atomized droplets react by heat, and conditions of reaction are not particularly limited as long as an object of a present inventive subject matter is not interfered with. According to this procedure, the thermal reaction is conducted at an evaporation temperature of the solvent in the raw material solution or higher temperatures, however, the temperature for the "thermal reaction" should not be too high (below 800° C., for example), and preferably at 600° C. or less, and most preferably at 500° C. or less. Also, the thermal reaction may be conducted in any atmosphere of a vacuum, non-oxygen atmosphere, reducing-gas atmosphere, and oxygen atmosphere, however, according to a present inventive subject matter, the thermal reaction is preferably conducted in non-vacuum environment, and further preferably under oxygen atmosphere. The thermal reaction may be conducted under any condition selected from among under atmospheric pressure, under pressurized atmosphere, and under reduced-pressure atmosphere, however, according to a present inventive subject matter, the thermal reaction is preferably conducted under atmospheric pressure.

By forming a film as mentioned above, the metal oxide film is able to be preferably formed. Also, thickness of a film to be obtained is easily adjusted by changing a film-formation time. According to a present inventive subject matter, the metal oxide film may be a single-layer film or a multilayer film, however, if the metal oxide film is a crystalline film (that is preferably a single crystal film), it is possible to obtain effects such as stress-relaxation effect by forming the metal oxide film to be a multilayer film, and also possible to enhance electrical conductivity in addition to crystallinity, and thus, the metal oxide film preferably include two or more layers.

According to the above-mentioned film-formation procedure, it is possible to easily obtain an electrically-conductive member including a metal oxide film having a contact resistance that is 500 mΩ·cm$^2$ or less with a contact area of 1 cm$^2$ and weight 400 N after the electrically-conductive member being soaked for 550 hours in sulfuric acid at pH2 and having a temperature of 60° C.

The electrically-conductive member, having sufficient corrosion resistance even in high potential environment, is able to be used for various parts, and examples of the various parts include an electric current collector, an electromagnetic wave shield, an electrode, a heat-radiating plate or member, electronic parts, semiconductor pars, and a separator of a fuel cell. The electrically-conductive member is preferably used in an electronic device including the various parts. The electronic device is not particularly limited, however, according to a present inventive subject matter, preferable examples of the electronic device include cell batteries such as solar cells and fuel cells. According to an aspect of a present inventive subject matter, the electrically-conductive member is appropriately used for a product in that the electronic device is arranged. Examples of the product include an electrical appliance and an industrial product, and specific examples include a digital camera, a printer, a projector, a device including a CPU such as a personal computer or a smartphone, a device with a power source such as a vacuum cleaner or an electric iron, and a power generator such as a fuel cell power generator. As embodiments of a present inventive subject matter, a layered structure may be used in an electronic device and/or machine with a drive unit. Examples of the electronic device and/or machine with the drive unit include a motor, a drive system, an electric car, an electric cart, an electric wheelchair, an electric toy, an electric airplane, an electric equipment, and a micro electro mechanical system (MEMS).

Figure 6:
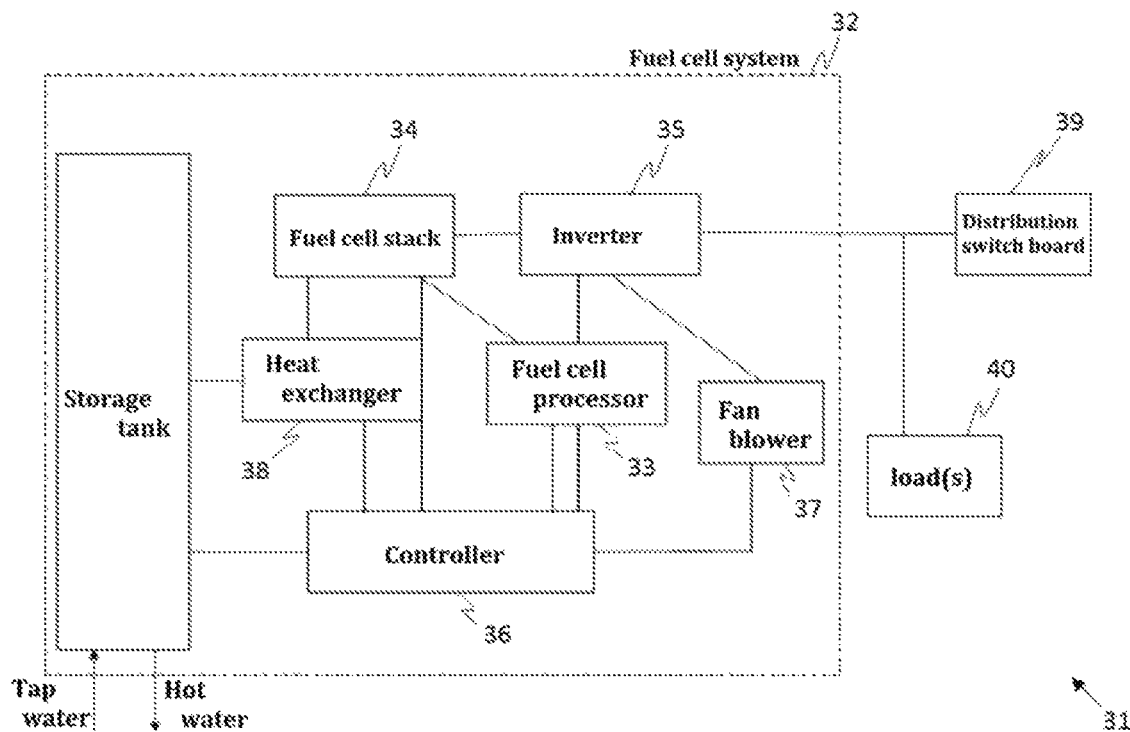
FIG. 6 shows a fuel cell system according to an aspect of a present inventive subject matter.

Also, the electrically-conductive member is, ordinarily, applicable to a system including the product and a CPU. FIG. 6 shows a schematic block diagram of a power generator system including the product (a fuel cell stack) and the CPU (controller) as an example. The power generator system 31 includes a fuel cell system 32, for example, and the fuel cell system 32 includes a CPU 36, a fan blower 37, a fuel cell processor 33 that is configured to generate fuel gas containing hydrogen as a major component from an original gas that may be a utility gas through steam-reforming, water-gas shift reaction, and selective oxidation reaction, and a fuel cell stack 34 that is configured to generate electricity by chemical reaction of the fuel gas and an oxidizing gas. The fuel cell system 32 further includes a heat exchanger 38 to collect heat generated from the fuel cell stack during electric power generation and store as hot water 42, which is originally supplied as tap water 41, in a water storage tank. As shown in FIG. 6, the fuel cell system 32 is connected to a commercial alternating current through a distribution switch board 39. Also, home appliances and industrial products are connected as loads 40 between the fuel cell system 32 and the distribution switch board 39. The fuel cell stack 34 starts to generate electricity, which is supplied through an inverter 35 to the loads 40 to be activated, and the heat generated from the fuel cell stack 34 is configured to be efficiently stored in the water storage tank. The home appliances and industrial products may be various electronic devices, which are not particularly limited and could be white goods including an air conditioner, a refrigerator, and a washing machine, other audio and/or visual equipment, beauty and/or barber equipment, a personal computer, a video game console, a portable device, machines and/or appliances for business use, and a device including a CPU, for example.

As mentioned above, the electrically-conductive member according to a present inventive subject matter is useful for any system requiring fuel cells such as power generating systems.

Examples according to a present inventive matter will be explained as follows, however, the present inventive matter is not limited thereto.

Example 1

1. Film (Layer)-Formation Apparatus

FIG. 1 shows a mist chemical vapor deposition (CVD) apparatus as a film (layer)-formation apparatus 1 used in this example. The mist CVD apparatus 1 includes a carrier gas source 2a, a flow-control valve 3a to control a flow rate of carrier gas that is configured to be sent from the carrier gas source 2a, a diluted carrier gas source 2b, a flow-control valve 3b to control a flow rate of a carrier gas that is configured to be sent from the diluted carrier gas source 2b, a mist generator 4 in that a raw material solution 4a is contained, a vessel 5 in that water 5a is contained, and an ultrasonic transducer 6 that may be attached to a bottom surface of the vessel 5, a film (layer)-formation chamber 7, a supply tube 9 connecting the mist generator 4 to the film (layer)-formation chamber 7, a hot plate 28 arranged in the film (layer)-formation chamber 7, and an exhaust port 11 to release atomized droplets and gas after a thermal reaction. Also, a substrate 10 is arranged on the hot plate 8.

2. Preparation of Raw-Material Solution

A raw-material solution was prepared to contain tin tetrachloride and ammonium fluoride such that tin and fluorine are to be 0.2:0.01 (tin:fluorine=0.2:0.01) in molar ratio in an aqueous solution.

3. Film (Layer)-Formation Preparation

Figure 2:
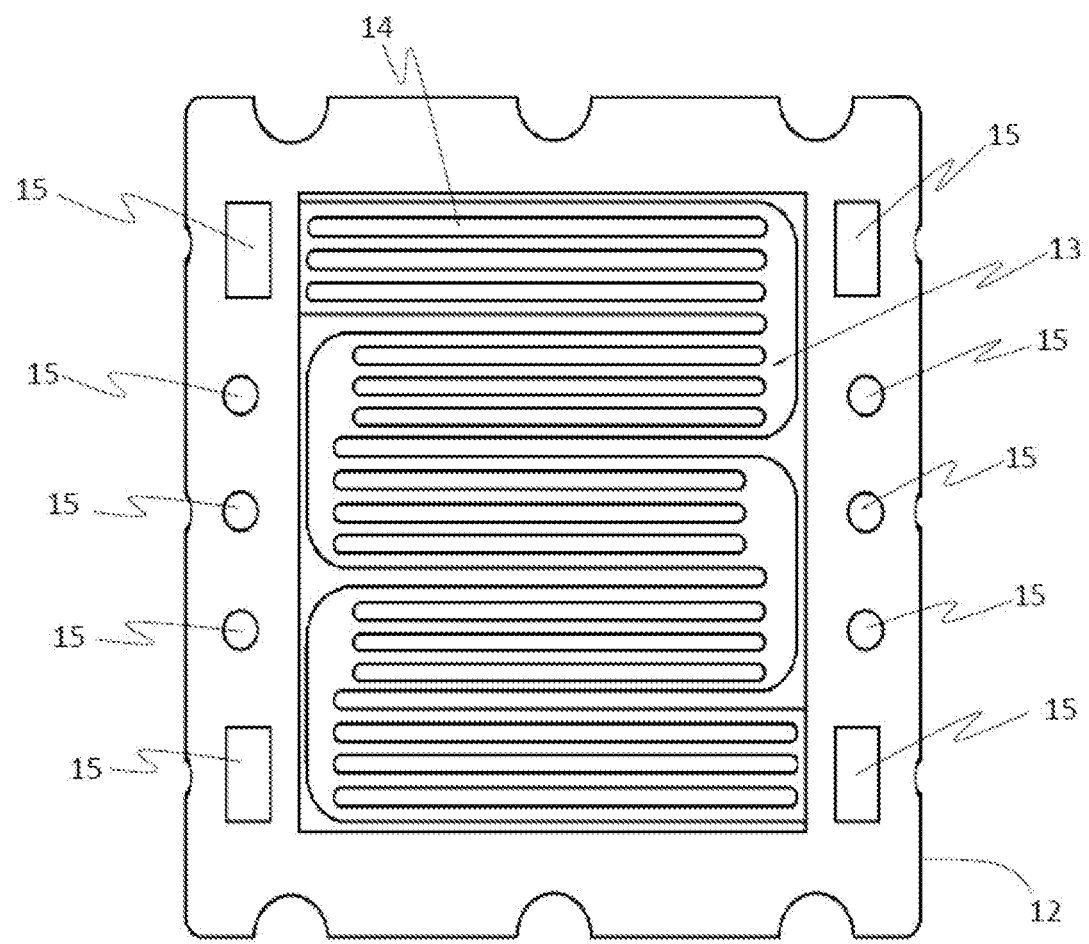
FIG. 2 shows a schematic configuration of a separator according to an aspect of a present inventive subject matter.

The raw-material solution 4a obtained as described at 2. was set in the mist generator 4. Next, a substrate 10 of stainless steel (SUS 304) including an uneven shape of a recessed portion and/or a projected portion on that a thermal oxide film is formed was placed on the hot plate 8 in the film (layer)-formation chamber 7. The hot plate 8 was activated to raise the temperature of the base member up to 450° C. Next, the flow-control valve 3a was opened to supply carrier gas from the carrier gas source 2a into the film (layer)-formation chamber 7 to replace the atmosphere in the film (layer)-formation chamber 7 with the carrier gas sufficiently. After the atmosphere in the film (layer)-formation chamber 7 was sufficiently replaced with the carrier gas, the flow rate of the carrier gas from the carrier gas source was regulated at 0.5 L/min. and the flow rate of the diluted carrier gas from the diluted carrier gas source 2b was regulated at 4.5 L/min. In this example, oxygen ($O_2$) was used as the carrier gas. Also, a schematic configuration of a separator used as a substrate 10 is shown in FIG. 2. The separator 12 used in this example is a separator including a flow pattern of serpentine, and the separator includes recessed portions 13 and projected portions 14, and a manifold 15 to supply reaction gas and/or coolant to each unit cell.

4. Film-Formation

Next, the ultrasonic transducer 6 was activated to vibrate at 2.4 MHz, and vibrations were propagated through water 5a in the vessel to the raw material solution 4a to generate atomized droplets from the raw material solution 4a. The atomized droplets 4b were introduced in the film (layer)-formation chamber 7 with carrier gas, and the atomized droplets heated and thermally reacted adjacent to the substrate 10 at 450° C. in the film (layer)-formation chamber 7 to be a film formed on the substrate 10, and the thickness of the film was 90 nm. The film that was obtained was firmly adhered to the substrate without a separation.

Comparative Example 1

As a comparative example, an evaluation test was conducted on a base member made of stainless steel (SUS 304) as it is.

Comparative Example 2

As a comparative example, a film of titanium nitride was formed on an electrically-conductive member by use of a sputtering method, and an evaluation test was conducted on the electrical-conductive member including the film of titanium nitride arranged on the electrical-conductive member.

<Evaluation Test>

As an evaluation test for each of the electrically-conductive members that were produced, a polarization test, a measurement of contact area resistivity, and a corrosion resistance test were conducted. The polarization test was performed using an anode polarization method. In the polarization test, the exposed area of the electrically-conductive member obtained in Example 1, Comparative Example 1, and Comparative Example 2 was measured as 1 $cm^2$. As a test solution, the test solution was prepared by adjusting a sulfuric acid aqueous solution to pH3 and deaerating the sulfuric acid aqueous solution with nitrogen and the solution temperature was set to 25° C. For the measurement, an electrochemical measurement system (Solatron SI1287 type) was used, and the reference electrode was an Ag/AgCl electrode in saturated potassium chloride and the counter electrode was a Pt wire. The potential sweep range was −0.8 to 1.6V (vs. Ag/AgCl) and the sweep rate was 1 mV/sec and polarized in a noble direction.

Figure 4:
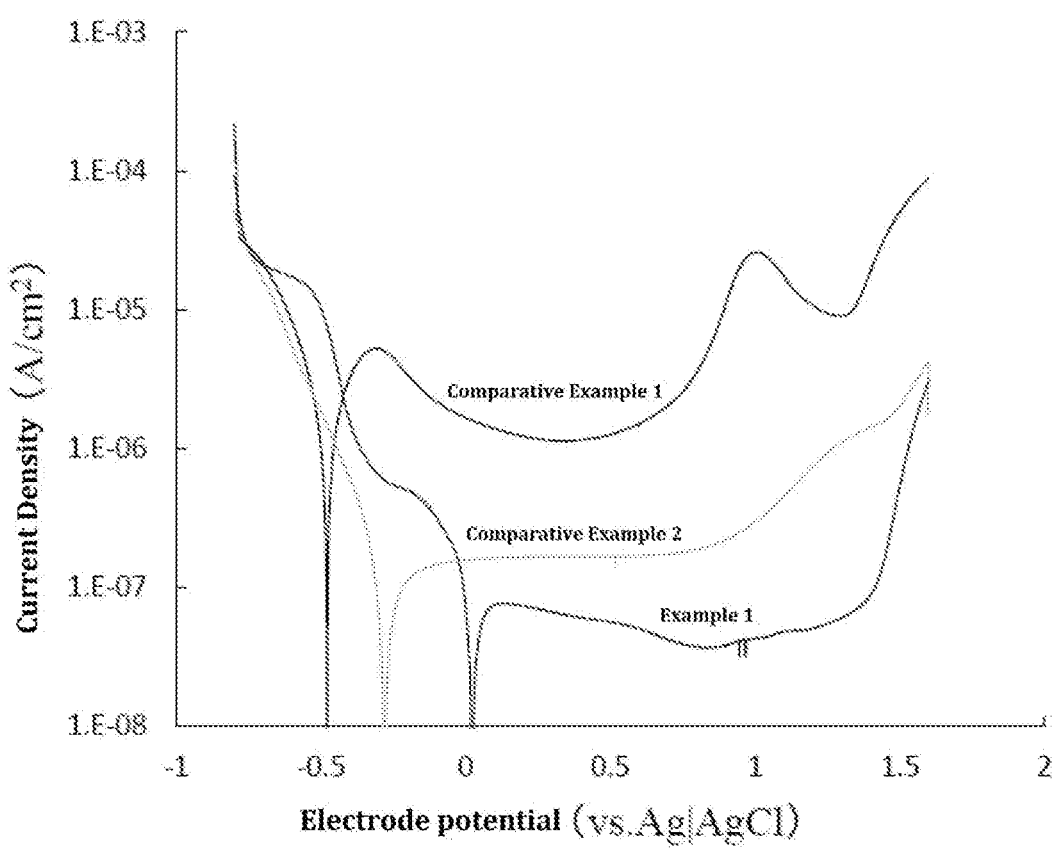
FIG. 4 is a graph showing a relationship of electrode potential and current density according to an embodiment.

FIG. 4 shows the results of the polarization test. It can be seen that the base member of the stainless-steel (SUS304) of Comparative Example 1 has a typical anode polarization curve in which all the ranges of the active potential range, passive potential range, and transpassive potential range appear. In contrast, it can be seen that the electrically-conductive member obtained in Example 1 exhibits a polarizing curve such that the polarizing curve directly enters the passive potential range from the natural electric potential. Also, it can be seen that the natural electric potential of the electrically-conductive member obtained in Example 1 is noble compared to the electrically-conductive members obtained in Comparative Examples 1 and 2, the current density in the passivation electric potential region is $1 \times 10^{-7}$ $A/cm^2$ or less, and the passivation electric potential region ranges from approximately 0V to 1.7V. (vs. SHE). From this, it can be seen that the electrically-conductive member obtained in Embodiment 1 is sufficient in corrosion resistance even in an acidic atmosphere to which the separator is exposed in a fuel-cell power generation environment and in a highly corrosive environment to which electric potential of 1.0 V is applied.

Figure 3:
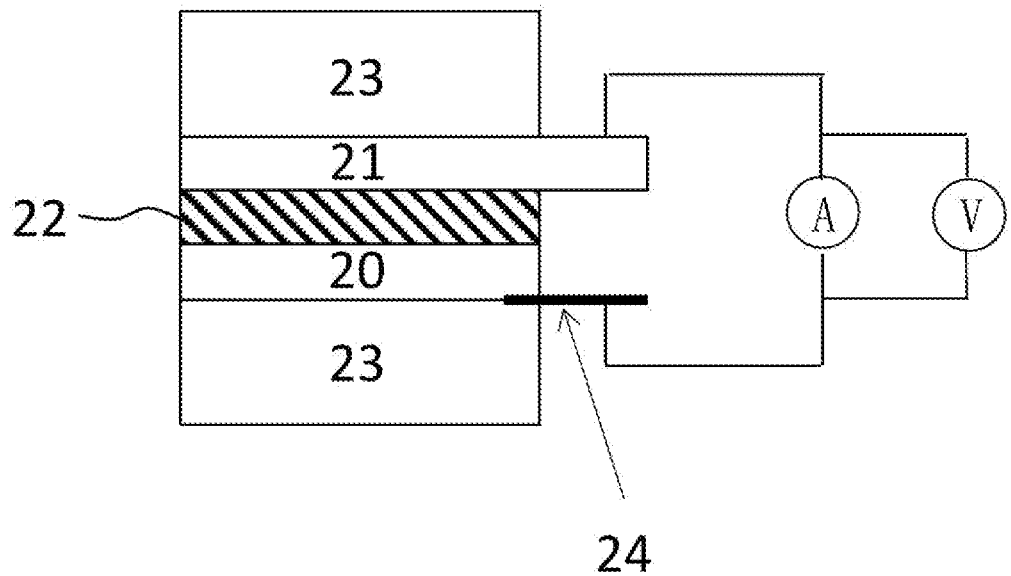
FIG. 3 shows a schematic configuration of a test device measuring contact area resistivity.

The measurement of the contact area resistivity was conducted by use of the test device shown in FIG. 3. In the test device, the conducting wire 24 welded to the electrode plate 21 and the separator 20 via the carbon sheet 22 (TGP-H-060 manufactured by Toray Corporation) that is disposed on the film-coated surface of the separator 20, and pressure retaining members 23 formed of electrically-insulating plates are disposed on both outer sides of the electrode plate 21 and the separator 20, respectively, and the pressure retaining members 23 are set to press from the both outer sides and hold respective members in close contact with each other of the members. An ammeter and a voltmeter are connected between the pair of the electrode plates 21 and the conducting wire 24.

The surface pressure applied to the pressure retaining member 23 was set to 400N, the size of the carbon sheet 22 was set to 1 cm×1 cm, and the contact area of the separator was set to 1 cm$^2$. When current is applied to the pair of electrode plates 21, two conditions of current flow were used: in the first condition, current was applied from one electrode plate to the other electrode plate, and in the second condition, current was applied in a reverse direction from the other electrode plate to the one electrode, and the resistances were obtained from the current values and voltages in the respective first and second conditions. The product of the obtained resistance value multiplied by the area value of separator was defined as the contact area resistivity.

In the corrosion resistance test, sulfuric acid was adjusted to pH2.0 and heated to have a temperature of 60° C., and the separator was soaked in the sulfuric acid for 550 hours. The evaluation of the corrosion resistance was conducted by measuring the contact area resistivity prior to the test and after the test, and evaluating the change.

Figure 5:
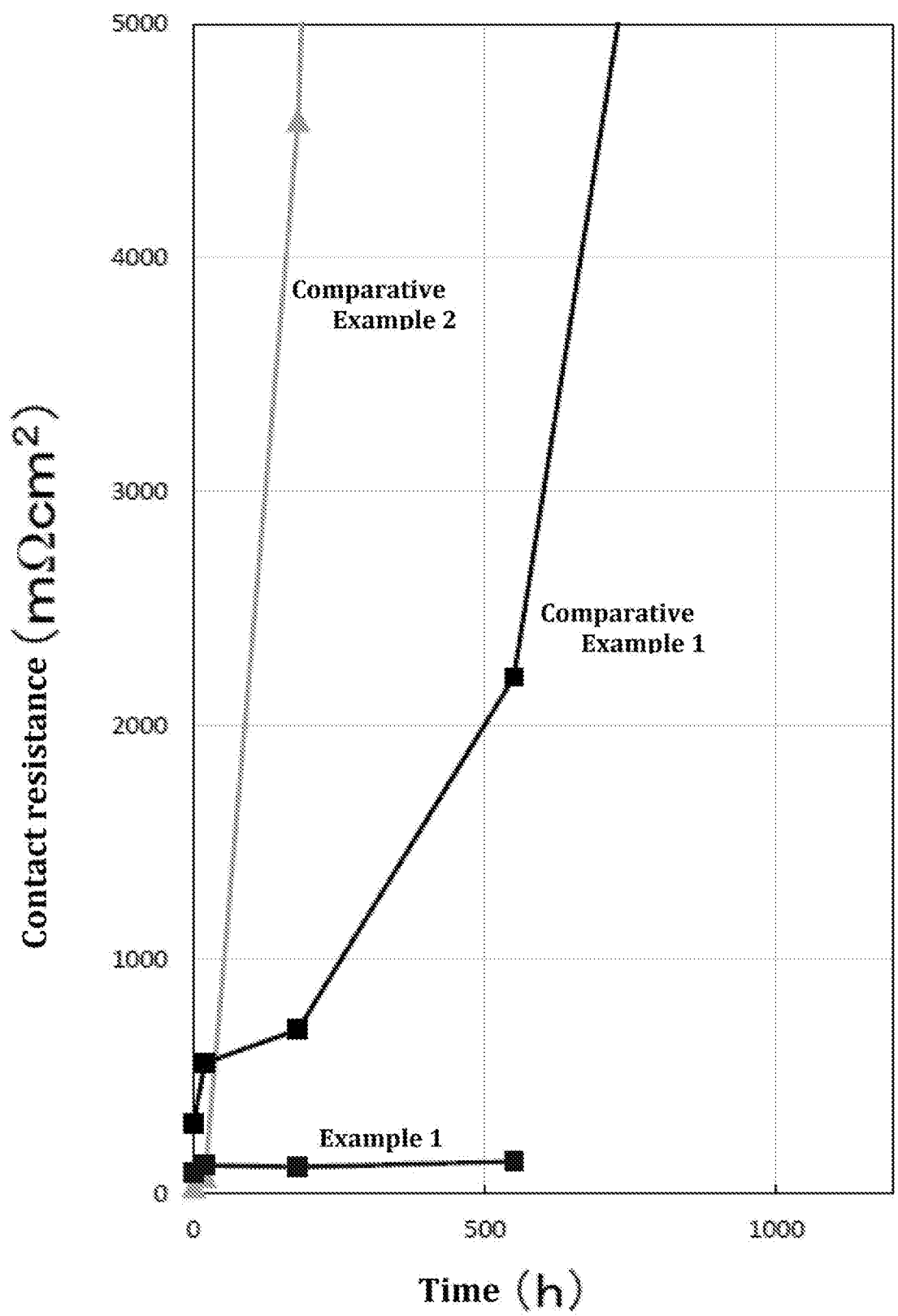
FIG. 5 is a graph showing a relationship of contact resistance and time according to an embodiment.

FIG. 5 shows changes in the contact resistivity prior to and after the corrosion resistance test of the separators obtained in the Example 1, Comparative Example 1, and Comparative Example 2.

From the evaluation results shown in FIG. 5, it can be seen that each of the separators in the Example 1, Comparative Example 2 and Comparative Example 3 had the contact resistance that is 100 mΩ·cm$^2$ or less prior to the corrosion resistance test, and thus, it can be seen that the separators had sufficient electrical conductivity. Also, in the Comparative Example 1 and Comparative Example 2, resistivities greatly increased over time, however, it was found that the increase in contact resistance in the Example 1 over time was very small and the resistivity was maintained to be 500 mΩ·cm$^2$ or less even after the soakage for 550 hours. From this, the film obtained in the Example 1 is found to be superior in durability and expected to hardly exhibit an output decrease even in a long-term operation of a fuel cell or the like.

As can be seen from the above described evaluation test, the electrically-conductive member according to a present inventive subject matter maintains sufficient corrosion resistance even in high potential environment.

Electrically-conductive members according to the present inventive subject matter maintain sufficient corrosion resistance even in high potential environment, and when used in a fuel cell, are able to exert corrosion resistance in almost the whole range of the targeted potential range for use, which enables to realize long-term operation of a fuel cell, and can be used for various fields requiring electrically-conductive members and especially useful for electronic devices including fuel cell separators and products in that the electronic devices are installed. Also, an electrically-conductive oxide film is able to be formed to be closely adhered to a base member, easily and industrially advantageously by the method of a present inventive subject matter, and thus, the method can be used in various fields using electrically-conductive members including a base member and an electrically-conductive oxide film formed on the base member, and especially useful for manufacturing electronic devices including various parts such as an electric current collector, an electromagnetic wave shield, an electrode, a heat-radiating plate or member, electronic parts, semiconductor pars, and a separator of a fuel cell.

REFERENCE NUMBER DESCRIPTION 1 a film (layer)-formation apparatus
2a a carrier gas source
2b a diluted carrier gas source
3a a flow-control valve
3b a flow-control valve
4 a mist generator
4a a raw material solution
4b a particle of raw material
5 a vessel
5a water
6 an ultrasonic transducer
7 a film (layer)-formation chamber
8 a hot plate
9 a supply tube
10 a substrate
11 an exhaust port
12 a separator
13 a recessed portion of an uneven shape
14 a projected portion of an uneven shape
15 a manifold
20 a separator
21 an electrode plate
22 a carbon sheet
23 a pressure retaining member
24 a conducting wire
31 a power generation system
32 a fuel cell system
33 a fuel cell processor
34 a fuel cell stack
35 an inverter
36 a controller
37 a fan blower
38 a heat exchanger
39 a distribution switch board
40 a load

What is claimed is:
1. An electrically-conductive member comprising:
an active potential range and a passive potential range in an anode polarization curve that is measured in a sulfuric acid aqueous solution having a sulfuric acid concentration that is $5.0\times10^{-4}$ mol/dm$^3$ at pH3 and having a temperature of 25° C.; and
an anode current density that is $1\times10^{-7}$ A/cm$^2$ or less in the passive potential range,
the passive potential range reaching to an electric potential that is 1V.
2. The electrically-conductive member of claim 1 further comprising:
a metal oxide film comprising a metal oxide as a major component, the metal oxide film arranged on at least a part of a surface or a whole surface on the electrically-conductive member.

3. The electrically-conductive member of claim 2, wherein the metal oxide comprises tin.

4. The electrically-conductive member of claim 2, wherein the metal oxide film is doped with a dopant.

5. The electrically-conductive member of claim 2, wherein the metal oxide film has a contact resistance that is 500 mΩ·cm² or less with a contact area of 1 cm² and weight 400 N after the electrically-conductive member being soaked for 550 hours in sulfuric acid at pH2 having a temperature of 60° C.

6. The electrically-conductive member of claim 1, wherein the electrically-conductive member comprises a base member that comprises as a major component stainless steel, carbon steel, nickel steel, iron, chrome, nickel, cobalt, niobium, tungsten, molybdenum, manganese, aluminum, copper, magnesium or an alloy combining two or more thereof.

7. The electrically-conductive member of claim 6, wherein the base member comprises an uneven shape comprising a projected portion and a recessed portion on at least a part of a surface or a whole surface of the base member.

8. The electrically-conductive member of claim 7, wherein the uneven shape comprising the projected portion and the recessed portion comprises a flow channel pattern.

9. The electrically-conductive member of claim 1, wherein the electrically-conductive member comprises a base member that comprises stainless steel as a major component.

10. The electrically-conductive member of claim 1, wherein the electrically-conductive member is a separator.

11. An electronic device comprising the electrically-conductive member of claim 1.

12. The electronic device of claim 11, wherein the electronic device is a fuel cell.

13. A product comprising:
the electronic device of claim 11.

14. The product of claim 13 further comprising:
a drive device.

15. A system comprising:
the product of claim 13; and
a CPU.

16. A method of manufacturing an electrically-conductive member comprising:
obtaining atomized droplets by atomizing a raw material solution comprising a metal;
supplying a carrier gas to the atomized droplets to carry the atomized droplets onto a base member; and
heating the atomized droplets adjacent to the base member to cause thermal reaction of the atomized droplets to form a passive film on at least a part of a surface or a whole surface of the base member.

17. The method of claim 16, wherein the passive film comprises a passive potential range in an anode polarization curve that is measured in a sulfuric acid aqueous solution at pH3 having a temperature of 60° C.

18. The method of claim 16, wherein the metal is tin.

19. The method of claim 16, wherein the raw material solution comprises a dopant.

20. The method of claim 19, wherein the dopant comprises antimony or fluorine.

21. The method of claim 16, wherein the raw material solution comprises a solvent that comprises water.

22. The method of claim 16, wherein the base member comprises as a major component stainless steel, carbon steel, nickel steel, iron, chrome, nickel, cobalt, niobium, tungsten, molybdenum, manganese, aluminum, copper, magnesium or an alloy combining two or more thereof.

23. The method of claim 16, wherein the base member comprises an uneven shape comprising a projected portion and a recessed portion on at least a part of a surface or a whole surface of the base member.

24. The method of claim 16, wherein the base member is a base member of a separator.

25. The method of claim 16, wherein the heating is conducted at a temperature that is 500° C. or less.

26. The method of claim 16, wherein the thermal reaction is conducted in a non-vacuum environment.

27. A method of manufacturing an electrically-conductive member comprises:
atomizing a raw material solution comprising a tetravalent metal to generate atomized droplets;
supplying a carrier gas to the atomized droplets to carry the atomized droplets onto a base member; and
heating the atomized droplets adjacent to the base member to cause thermal reaction of the atomized droplets to form a metal oxide film on at least a part of a surface or a whole surface of the base member such that the electrically-conductive member comprising the base member and the metal oxide film formed on the at least the part of the surface or the whole surface of the base member comprises a passive potential range in an anode polarization curve that is measured in a sulfuric acid aqueous solution at pH3 and having a temperature of 60° C.

* * * * *